June 13, 1939.  J. C. HELMS ET AL  2,162,431
PIPE JOINT
Filed July 5, 1938

Inventors
Jay Calvin Helms and
Ira Richard Devonald

By
Attorney.

Patented June 13, 1939

2,162,431

UNITED STATES PATENT OFFICE 2,162,431

PIPE JOINT

Jay Calvin Helms and Ira Richard Devonald, Alexandria, Va., assignors to Helms Concrete Pipe Company, Inc., Alexandria, Va., a corporation of Virginia Application July 5, 1938, Serial No. 217,560

2 Claims. (Cl. 285—112)

This invention relates to improvements in fluid conduits, and is more particularly concerned with the joints provided between sections of such fluid conduits.

One of the features of the present invention is the provision of a joint which is assembled from the interior of the pipe, and in which the fluid pressures are effective for increasing the tightness of the established joint. Another feature is the provision of a joint for sections of concrete pipe, in which the parts are located within the pipe and permit angular displacements of the sections with respect to one another. A further feature is the provision of a joint for sections of concrete pipe, in which the elements constituting the joint may be protected and the interior of the pipe made smooth.

With these and other features as objects in view, as will appear in the course of the following specification and claims, illustrative forms of practicing the invention are shown on the accompanying drawing, in which:

Figure 1:
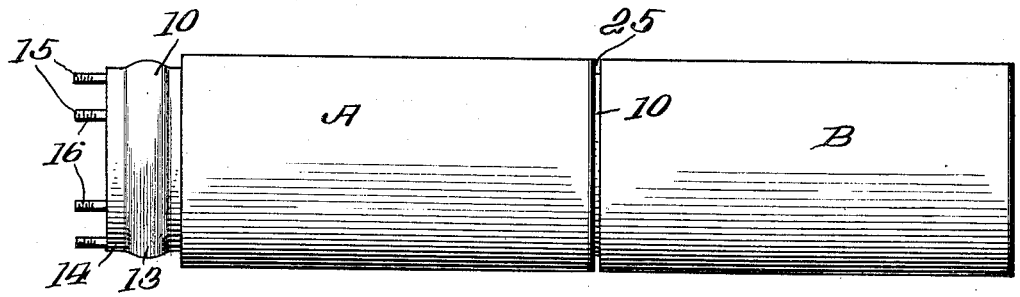
Figure 1 shows two pipe sections connected by a joint of the present type.

In Fig. 1 of the drawing, a pipe section A is shown as identical in form with a pipe section B, the two sections being connected by a joint.

Figure 2:
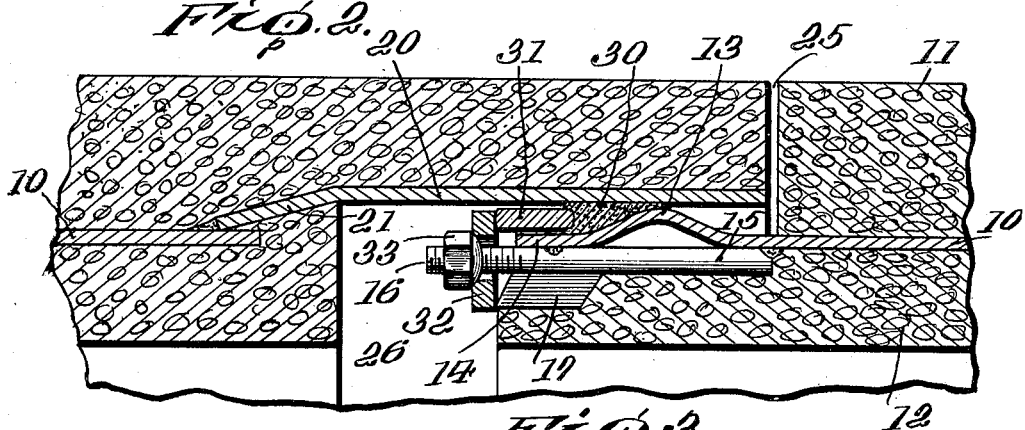
Figure 2 is an enlarged fragmentary section showing the parts of the joint.

Each of these pipe sections, in the form illustrated in Fig. 2, has a steel cylinder 10 embedded between the outside concrete coating 11 and the inside concrete coating 12. This cylinder is deformed, prior to the placing of the concrete coatings, to provide a swell 13 at the spigot end of the pipe; and in the illustrated form, this swell is located a short distance from the spigot end of the cylinder to provide a short cylindrical end portion 14. These cylinders provide internal reinforcing sleeves which are impermeable to the fluid, and thus prevent leakage even in the event of cracking of the concrete coatings.

At the spigot end, furthermore, the steel cylinder receives a plurality of bolts 15 which are welded directly to the inner surface of the metal sleeve in the form illustrated in Fig. 2 and have threaded ends 16 which project beyond the end 14 of the sleeve. Metal bearing bosses 17 may similarly be welded to the bolts 15, either as individual pieces for each bolt or as an internal ring concentric with the end portion 14 of the sleeve. When these bosses are employed, it is preferred to have their outer ends or faces beveled so that the radially inward end portion projects beyond the portion thereof which engages the bolt 15.

The other end of each sleeve end is provided with a bell ring having a portion 20 which is of substantially uniform cross-section: thus, with the usual cylindrical pipe, this bell ring itself has a cylindrical internal surface. The bell ring also has a conical portion 21 of decreasing diameter which is secured to the corresponding end of the sleeve 10 by welding, in this illustrated form, so that a liquid-tight and stiff mechanical assembly is provided. The bell ring 20, 21 may be made of a strip of steel of appropriate length for the periphery involved, by a flanging or rolling operation to provide a portion 21, and is then formed into the circular or other shape necessitated by the configuration to be given the pipe. Similarly, the swell 13 may be formed integrally as shown in Fig. 2, by a flanging or rolling operation.

The external diameter of the swell 13 is preferably slightly smaller than the internal diameter of the bell ring portion 20 for easy reception therein during the construction of the conduit line. The concrete coatings 11, 12 are made of lengths less than the combined lengths of the sleeves 10 with the bell rings thereon, so that there is a space 25 between the outside coatings to permit the assembly of the individual sections at angles to one another, so that the conduit line may be formed on a curve. Similarly, the inside coatings 12 have their ends spaced apart, upon assembly, to provide an annular inside groove 26. It will be noted that this groove is of such longitudinal dimension along the conduit line that space is afforded between the ends 16 of the bolts 15 and the adjacent end of the inner concrete coating 12 of the mating bell section, and that assembly of the parts is feasible after the sections have been brought together.

After the sections have been brought together, a sealing gasket 30 is introduced into the annular space between the end 14 of the sleeve 10 at the spigot end of the section and the inner wall of the bell ring section 20 of the bell end of the mating pipe section. This annular space converges by reason of the swell 13 toward the end of the bell ring section 20. Such a packing gasket may be of rubber or like material, or may be of other recognized packing material such as lead, oakum, etc., according to the nature of the fluid, its pressure, etc., which is to pass through the conduit line. It is preferred to have this sealing gasket of resiliently or elastically yieldable material such as rubber.

A compression member 31 is then introduced into this annular space: this compression member may be a closed ring or an open ring, or may be comprised of separate segments. It has an annular thickness in the radial direction which is less than the average distance between the end 14 of the sleeve 10 and the inner surface of the bell ring portion 20, so that it moves easily therein and will permit the movement of fluid from the conduit into engagement with the packing gasket 30, in the form shown in Fig. 2.

The compression member 31 may be pushed or driven onto the end 14, if desired, preliminary to the final clamping of the gasket 30.

The washers 32 are placed on each of the bolts 15, 16 so that they engage with the compression member 31. Nuts 33 are then employed on the threaded ends 16 of the bolts for forcing the parts together and for moving the gasket 30 into tight sealing relationship in the convergent annular space. It is preferred to form the nuts 33 with spherical ends and to have the washers 32 provided with correspondingly shaped sockets: this has been found advantageous in assuring a proper seating and maintenance of pressure upon the compression member 31 and the gasket 30.

While the conduit is in service, the pressure of fluid is exerted against the larger end surface of the gasket 30 and also upon the compression member 31, and serves to maintain the joint, as this pressure tends to force the gasket into better engagement with the inner surface of the bell ring portion 20 and with the outer surface of the swell 13. It has been found in practice that the established joint has a high degree of resistance against longitudinal separation of the sections, as it adequately resists the tendency of these sections to separate by reason of internal pressures.

Figure 3:
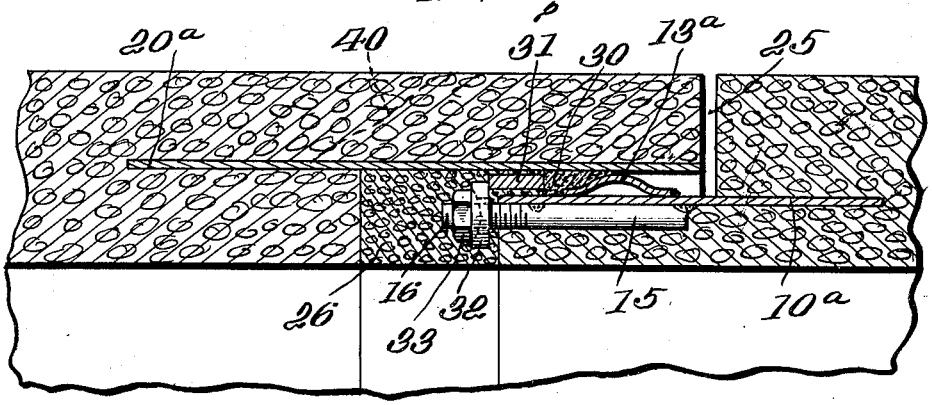
Figure 3 is a view corresponding to Fig. 2, but showing modifications in the joint.

In the modified form shown in Fig. 3, the construction has been simplified by omitting the bearing bosses 17, and the individual pipe sections do not have the steel sleeves 10. The bell ring 20a is shown as a simple cylinder which is embedded in the material of the pipe section during the course of manufacturing, which may be by the centrifugal process. The spigot end has a similar but smaller cylindrical sleeve section 10a of simple form, upon which is mounted an annular boss 13a which may be formed by rolling a narrow skelp to the desired form and then curving it to conform to the sleeve section 10a and welding it thereto. The bolts 15 are then welded inside of the sleeve section 10a. The sleeves 20a, 10a are located in the centrifugal casting forms and the concrete is then cast in position, usually flowing out the bell end to the approximate limit shown by the dotted line 40. The space outside of the sleeve portion 20a may then be filled with further concrete by a separate packing operation with an extrusion gun or the like, either before the pipe section is removed from the centrifugal form or afterward by use of a short external form, or while in the trench. It will be noted that this portion of the pipe is utilized for protecting the sleeve section 20 and that it is not subjected directly to the possibility of outward leakage.

The packing gasket 30, the compression member 31, the washer 32, and the nut 33 are indicated as similar to the form illustrated in Fig. 2. It will be noted that the end 16 of the bolt, the nut 33, and the compression member 31 extend into the annular inside groove 26. It is possible to fill this groove with a suitable grouting or like material in the customary manner to provide a smooth inside surface to the conduit, and to cover and protect the clamping and sealing element from contact with the fluid.

It is obvious that the illustrative forms of construction are not restricted, but that the invention may be practiced in many other ways.

We claim:

1. A joint for a fluid conduit formed of a plurality of sections of pipe, one of said sections having a metal bell ring with an internal surface of substantially uniform cross-section, and the adjacent section having a spigot end including a swell on the said spigot and located within the said bell ring, a plurality of bolts secured to the spigot end and located inside the same and having threaded ends projecting beyond the ends of the spigot, an elastically yieldable sealing gasket located in the space between the bell ring and the swell, a compression ring extending at least in part into said space and bearing upon said gasket, and clamping devices located within the conduit and including nuts engaged with said bolts for pressing said compression member against said gasket and thereby forcing said gasket along the converging surfaces of the bell ring and swell.

2. A jointed conduit for fluids comprising a plurality of sections of pipe, each section having longitudinal reinforcing means and concrete coatings inside and outside of said reinforcing means, the section having bell and spigot ends for interengagement at the joints between the sections, the inside concrete coating at a bell end terminating short of the end of the section for providing an internal annular groove between the same and the spigot end of the adjacent section, the outside concrete coating at the spigot end of said adjacent section terminating short of the end of said section for permitting angular positioning of the sections, each spigot end having an outward swell within the bell of the adjacent section for providing an annular space which converges along the edge of the conduit toward the end of the bell, a resiliently yieldably gasket located in said space, and means for pressing the gasket into said space including a first part attached to the spigot end and a second part engaging and movable in a relatively axial direction with respect to said first part, said parts extending into and being accessible at said annular groove.

JAY CALVIN HELMS.
IRA RICHARD DEVONALD.